(No Model.) 2 Sheets—Sheet 2.
J. SWENSON.
CHURN.
No. 283,302. Patented Aug. 14, 1883.
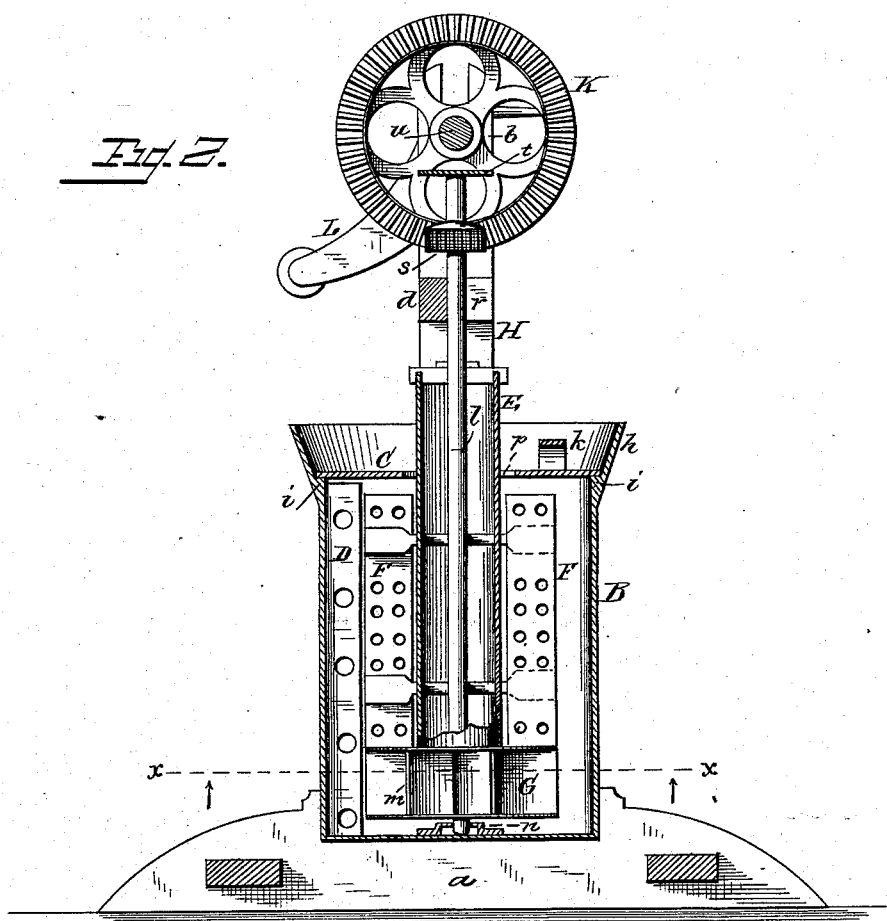
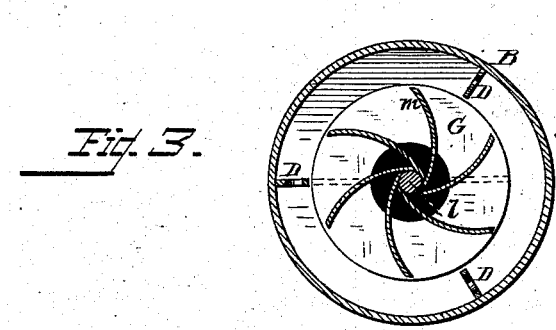
WITNESSES
Franck L. Ouraud
N. E. Oliphant
INVENTOR
Jonas Swenson
per Chas. H. Fowler
Attorney

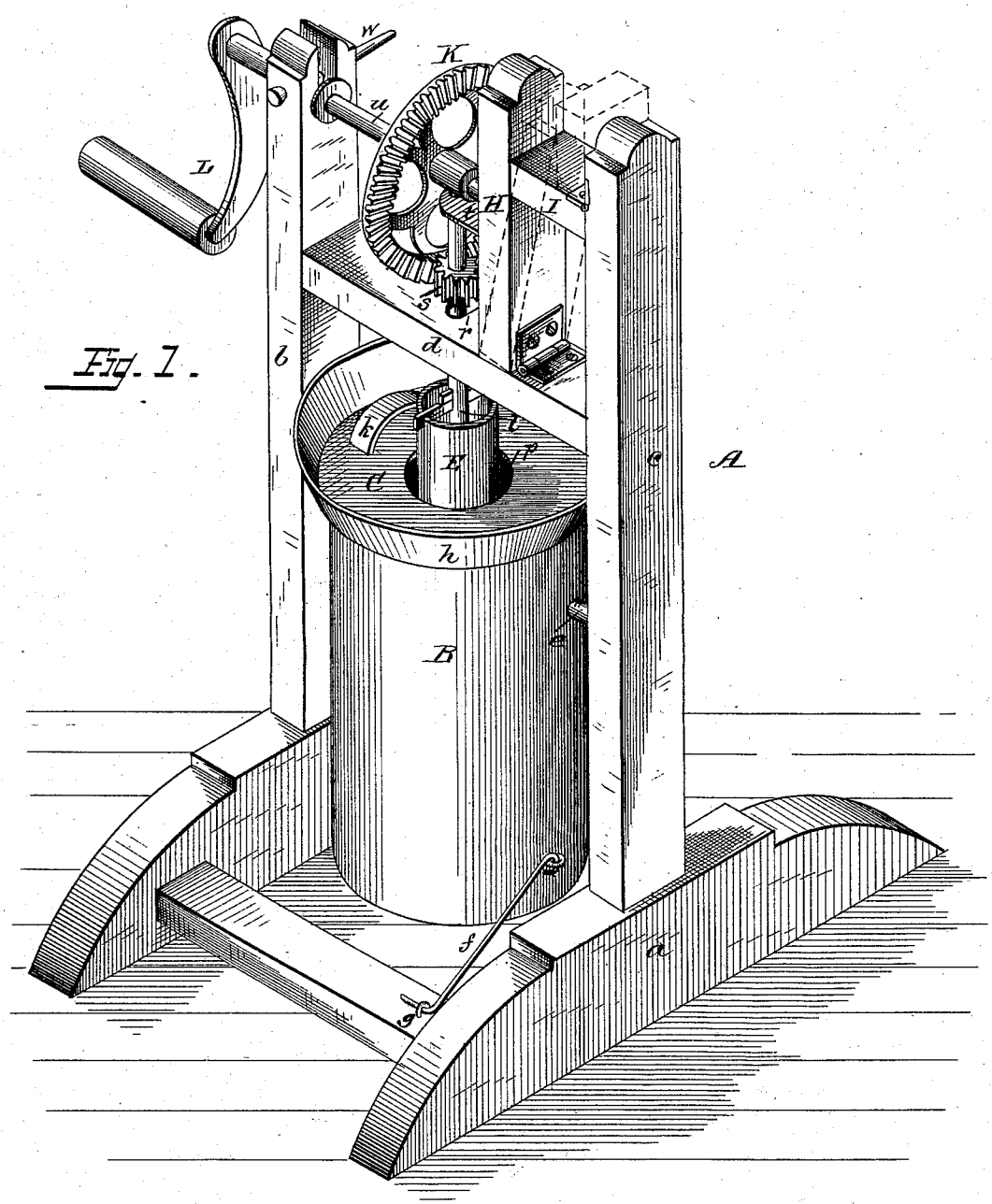

UNITED STATES PATENT OFFICE.

JONAS SWENSON, OF AURORA, NEBRASKA.

CHURN.

SPECIFICATION forming part of Letters Patent No. 283,802, dated August 14, 1883.

Application filed March 21, 1883. (No model.)

*To all whom it may concern:*

Be it known that I, JONAS SWENSON, a citizen of the United States, residing at Aurora, in the county of Hamilton and State of Nebraska, have invented certain new and useful Improvements in Churns; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a longitudinal vertical section, and Fig. 3 a horizontal cross-section, taken on line $x$ $x$ of Fig. 2, with frame removed.

The present invention has relation to certain new and useful improvements in that class of rotary churns in which the dasher-shaft is provided at its lower end with a turbine head or wheel to thoroughly agitate the cream and draw the air through the same.

The object of the present invention is to improve the construction of the above-mentioned class of churns, whereby the milk or cream is more thoroughly and effectually agitated and the separation of the oily globules from the other portions of the milk or cream accomplished in less time, while the air is caused to be distributed through the contents of the churn-cylinder, thus producing butter of superior quality in a comparatively short space of time. These several objects above stated I attain by the construction substantially as shown in the drawings, and hereinafter described and claimed.

In the accompanying drawings, A represents a suitable frame, consisting of the base $a$, standards $b$ $c$, and cross-brace $d$.

The churn-cylinder B is supported within the frame A by trunnions $e$, projecting from the sides of said cylinder, and entering bearings or recesses in the standards $b$ $c$, one of the recesses being of such form as to admit of the trunnions being disconnected therefrom and the cylinder removed for cleaning or other purposes, the cylinder, near its bottom, having a hinged rod, $f$, hooked at its end to engage with a staple, $g$, on the base of the frame, thus holding the cylinder stationary while the churn is in operation. The cylinder B has a flaring rim, $h$, extending around its upper edge, and a circumferential shoulder, $i$, upon its inner periphery for supporting a cover, C, provided with a suitable handle, $k$. The cylinder upon its interior is provided with vertically-arranged perforated plates D, extending the entire length of the cylinder, against which the milk or cream is forced by the rotary motion of the dasher.

The dasher-shaft $l$ extends down through an induction air-tube, E, and is rigidly connected thereto, so that when said shaft is rotated it will carry the tube with it. The tube E has connected to it perforated vertical dashers F, and at its lower end is a turbine, G, rigidly connected to said tube and revolving therewith. The turbine has the usual cycloidal buckets, $m$, and the tube is open at its lower end to communicate with said turbine, and the dasher-shaft $l$ extends below it, and is supported by the step $n$ upon the bottom of the cylinder. The opening $p$ in the cover C is of greater diameter than the tube E, so as to form a space for the escape of the air after passing through the milk or cream. The tube E extends through the opening $p$, and some distance above the cylinder B, and when said tube and turbine are in motion the fresh air is drawn or sucked in at the top of the tube, and, passing down and out between the buckets of the turbine, is forced through the milk or cream and escapes through the space between the cover and tube, as above stated.

The dasher-shaft $l$ extends above the tube E and through an open slot, $r$, in the cross-brace $d$ of the frame A, and has secured to it a pinion, $s$, the extremity of the end of said shaft entering a perforation in a plate, $t$, projecting from the side of a bracket, H. This bracket, at its lower end, is hinged to the upper side of the brace $d$, and is held in an upright position by the block I, hinged to the inner side of the standard $c$. This bracket H, when in an upright position, forms a bearing for one end of a horizontal shaft, $u$, which carries the gear-wheel K, keyed thereto, the opposite end of the shaft being supported in an open slot in the end of the standard $b$, and retained in place by a removable pin, $w$, said shaft being rotated by the crank-handle L.

When desired to remove the cylinder B and shaft $l$, with its connections, from the frame A, the rod $f$ is disengaged from its staple, the block I thrown up, and the bracket thrown back, as shown in dotted lines, Fig. 1. This will disconnect the plate $t$ from shaft $l$ and bracket H from shaft $u$, allowing the former to be slipped out of the open slot $r$ and the trunnions $e$ to be disconnected from the standards $b$ $c$, thus admitting of the cylinder B, shaft $l$, with the tube E, and turbine G being removed from the frame A.

Having now fully described my invention, what I claim as new, and desire to secure by Letters Patent, is—

1. The cylinder B, having upon its interior perforated plates D, in combination with the rotary tube E, having dashers F and turbine G, and the rod $l$, extending up through the tube and provided with suitable means for rotating it, substantially as and for the purpose described.

2. The frame A, provided with the hinged bracket H, having connected thereto the plate $t$ and the hinged block I, in combination with the churn-cylinder B, supported within the frame, and the shafts $l$ $u$, having suitable gear-wheel, substantially as and for the purpose described.

In testimony that I claim the above I have hereunto subscribed my name in the presence of two witnesses.

JONAS SWENSON.

Witnesses:
A. G. HOEGREN,
WM. P. HELLINGS.